3,123,638
AMIDOMETHYLATION OF AROMATIC HYDROCARBONS
William D. Schaeffer, Pomona, Calif., assignor to Union Oil Company of California, Los Angeles, Calif., a corporation of California
No Drawing. Filed June 16, 1961, Ser. No. 117,514
14 Claims. (Cl. 260—562)

This invention relates to the amidomethylation of aromatic hydrocarbons with N-methylolamides, to form mono- or poly-amidomethylated products. The process consists simply in contacting the desired aromatic hydrocarbon, which must contain at least one replaceable ring hydrogen atom, with the desired N-methylolamide in the presence of a catalyst selected from the group consisting of anhydrous hydrofluoric acid, trifluoroacetic acid, and aliphatic or alicyclic sulfonic acids.

This application is a continuation-in-part of my copending application Serial No. 692,244.

The principal object of the invention is to provide amidomethylation catalysts which are selective in their action, and yet sufficiently active to complete the reaction at moderate temperatures and reaction times. A further object is to provide catalysts of the above character, which are in addition economical both in use and initial cost. Other objects will be apparent from the detailed description of my invention.

The amidomethylation of aromatic compounds in the presence of acid condensation catalysts is in general well known. The following equation illustrates the general nature of the reaction where benzene is the raw material:

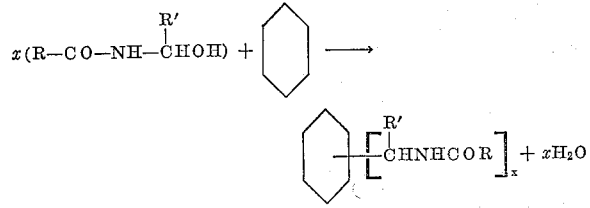

wherein R and R' may be any compatible substituent. The resulting amidomethylated compounds are useful intermediates for the production of a variety of valuable products. They may for example be oxidized to form aromatic acids, or hydrolyzed to form aromatic mono- or polybenzylamines which may contain substituents in the α-position. Previously known amidomethylation catalysts are either so expensive, or nonselective, or of such low activity, that the process has never been considered attractive for the manufacture of chemical intermediates. In general, previously known amidomethylation catalysts result in poor yields and low conversions, and excessively long contact times may be required. In contrast, the amidomethylation catalysts of my invention are very active, generally producing yields in excess of 50%. Additionally, when a substituted aromatic is amidomethylated, I have found that the catalysts of my invention are very selective in the position of amidomethylation.

It has long been known that aromatic compounds containing an electron-donating functional group on the ring are very easily amidomethylated. For example, aromatic compounds containing attached to the ring a hydroxyl group, an alkoxy group, or the like can be easily amidomethylated using substantially any acidic condensation catalyst. In the past, concentrated sulfuric acid, hydrochloric acid, zinc chloride, and the like have been employed to effect amidomethylation of e.g., phenols, anisoles and the like.

It has now been found that condensation catalysts which are well suited for the amidomethylation of aromatics containing an electron-donating polar functional group are often totally ineffective for the amidomethylation of aromatic hydrocarbons. For example, it has been found that concentrated sulfuric acid is ineffective for amidomethylating reactive aromatic hydrocarbons, the predominating reaction being in most cases sulfonation. Concentrated or dilute hydrochloric acid has also been found to be substantially wholly inactive at feasible temperatures and reaction times.

In contrast, I discovered that anhydrous hydrogen fluoride, trifluoroacetic acid, acyclic alkane sulfonic and alicyclic sulfonic acids are very active for amidomethylation. Moreover, good control can be maintained; by varying the mole-ratio of N-methylolamide used, either mono-amidomethylated or poly-amidomethylated products can readily be obtained. These results are obtained moreover at ordinary room temperatures and with short reaction periods of about one to two hours.

The catalysts of my invention are also selective in the amidomethylation of alkylbenzenes, e.g., liquid hydrogen fluoride yields up to 99%, ortho amidomethylated toluene from toluene; trifluoroacetic acid yields up to 95% of the para derivative whereas the aliphatic and alicyclic sulfonic acids yield about a 1:1 mixture of the ortho and para isomers. Very little of the meta isomer is produced by any of the catalysts of my invention.

The N-methylolamides used herein are ordinarily prepared by reacting a carboxylic acid amide with formaldehyde, paraformaldehyde, etc., as follows:

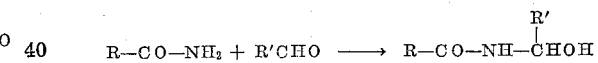

wherein R and R' may be any compatible substituent. This preparation is well known and hence need not be described in detail. As used herein, the term N-methylolamide is generic to N-methylolamides and to N-methylolamides having a substituent in the methylol group such as an alkyl or halo radical obtained by the use of acetaldehyde, propanal, butanal, chloral, tolualdehyde, bromal, etc., in the aforedescribed reaction.

Suitable amidomethylating agents to be used herein include in general any N-methylolamide which is free of interfering functional groups. Such agents may be designated by the formula:

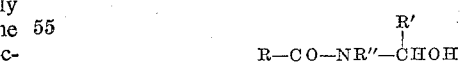

wherein R may be another —NR''—CH$_2$OH group, hydrogen, methyl, ethyl, propyl, isopropyl, butyl, isobutyl, hexyl, dodecyl, etc.; and R'' may be hydrogen, methyl, ethyl, propyl, isopropyl, butyl, isobutyl, hexyl, dodecyl, formyl, acetyl, and the like. In any of the foregoing permutations, the terminal ends of the R and R'' radicals may be joined together to form a cyclic amide or imide.

Suitable examples include N-methylol formamide, N-methylol acetamide, N-methylol propionamide, N-methylol-N-methylol diacetamide, N-methylol succinimide, bismethylol urea, 2,5-diketo-piperazine, and the like. The preferred class of N-methylolamides is represented by the formula:

$$R—CO—NH—CH_2OH$$

wherein R is hydrogen or a lower alkyl radical having from 1 to about 6 carbon atoms and is derived from the reaction of formaldehyde or paraformaldehyde with the corresponding carboxylic acid amide.

Suitable aromatic hydrocarbons which may be amidomethylated herein include benzene, naphthalene, anthracene, phenanthrene, diphenyl, diphenylmethane, triphenylmethane, toluene, ethylbenzene, cymene, cumene, p-xylene, m-xylene, o-xylene, pseudocumene, p-ethyl toluene, m-ethyl toluene, o-ethyl toluene, mesitylene, hemimellitene, p-diethylbenzene, m-diethylbenzene, o-diethylbenzene, 2-ethyl-p-xylene, 5-ethyl-m-xylene, 4-ethyl-o-xylene, durene, isodurene, n-dodecyl benzene, α-methyl naphthalene, β-methyl naphthalene, 1,5-dimethyl naphthalene, 1,4,5,8-tetramethyl naphthalene, tetralin, and the like. Mixtures of such compounds may also be employed. In general, any monocyclic or polycyclic aromatic or alkylaromatic hydrocarbon containing at least one active ring hydrogen atom may be employed.

Aromatics containing carboxylic acid groups can also be amidomethylated by the catalysts of my invention in contrast to the failure of prior art catalysts such as hydrogen chloride to effect the amidomethylation. Examples of such carboxylated aromatic containing an active ring hydrogen are: phenylacetic acid, phenylpropanoic acid, naphthaleneacetic acid, phenoxyacetic acid, etc.

As previously mentioned, the amidomethylation step of my invention is performed in the presence of an acid catalyst selected from the group consisting of anhydrous hydrogen fluoride, trifluoroacetic acid, acyclic alkane sulfonic and alicyclic sulfonic acids having about 1 to about 8 carbon atoms. The preferred catalysts are those exhibiting a high degree of activity and include hydrogen fluoride, trifluoroacetic acid and acyclic alkane sulfonic acids having about 1 to 3 carbon atoms, e.g., methyl sulfonic acid, ethane sulfonic acid, etc.

Any of the catalysts can be used in admixture with a solvent such as acetic acid, dioxane, dialkyl sulfones and the like. Generally, between about 0.1 and 10 volumes of solvent per volume of catalyst can be used. Anhydrous hydrogen fluoride and trifluoroacetic acid suitably serve also as the reaction media; sufficient pressure being employed at the reaction temperature to maintain these acids in liquid phase. Accordingly, the use of a solvent with these catalysts is optional. The sulfonic acid catalysts, however, are employed with one of the aforementioned solvents; acetic acid in amounts between about 0.5 and 2 volumes per volume of sulfonic acid being preferred.

The sulfonic acids suitable as catalysts of amidomethylation in accordance with my invention are acyclic alkane and alicyclic sulfonic acids having between about 1 and 8 carbon atoms. Examples of these acids are methyl sulfonic acid, ethane sulfonic acid, normal and isopropane sulfonic acids, normal and isobutane sulfonic acids, normal and isopentane sulfonic acids, normal and isohexane sulfonic acids, benzene sulfonic acid, toluene sulfonic acid, xylene sulfonic acid, etc. The low molecular weight alkane acids are preferred because of their high degree of activity. Examples of these are methyl sulfonic acid, ethane sulfonic acid, propane sulfonic acid, isoacid, propane sulfonic acid or mixtures thereof.

The amidomethylation is normally conducted in liquid phase at moderate temperatures of, e.g., 0 to 200° C., preferably between about 10 and 120° C. when using the more active catalysts such as hydrogen fluoride, trifluoroacetic acid and methyl sulfonic acid. In general, pressures between 1 and 20 atmospheres are employed at these temperatures, so as to maintain liquid phase conditions. Slightly higher temperatures, e.g., between about 50 and 150° C. are preferred for use with the less active catalysts. In general, higher temperatures provide faster rates of amidomethylation and favor completion of the reaction. Under the aforementioned conditions of temperature and catalyst, the reaction will ordinarily be completed in about 20 minutes to 2 hours. The reaction period also depends on the reactivity of the aromatic, highly active materials such as durene, pseudocumene, p-xylene, etc., being rapidly amidomethylated within about 20 minutes to about 1 hour.

I have also found that the reaction temperature influences the position of amidomethylation of the aromatic ring, the higher temperatures tending to equalize the amounts of ortho and para isomers. As an example, trifluoroacetic acid at 30° C. produces an amidomethylated toluene derivative which is about 96% of the para and about 4% ortho isomer. At 94° C., however, the product is 75% para and 25% ortho isomer.

Where mono-amidomethylation is desired it is preferred to use a slight mole excess of aromatic hydrocarbon, as the excess hydrocarbon is normally easier to recover than excess N-methylolamide. Where diamidomethylation is desired it is preferred to use substantially two moles of N-methylolamide per mole of hydrocarbon. To effect the reaction, the desired reactants plus the catalyst are simply agitated together for the required length of time until the reaction is complete. In a preferred modification, the N-methylolamide is added gradually to the hydrocarbon-catalyst mixture, in order to avoid side reactions as far as possible. This modification is particularly desirable when higher temperatures are employed, which sometimes tend to cause two molecules of the N-methylolamide to react with each other, with elimination of water and the formation of a diamido ether or a methylene bis-amide. The solid amidomethylated product is then recovered as by filtration, and the catalyst components and any excess hydrocarbon may be recovered in any desired manner, as by distillation.

The amidomethylated product can be recovered by several methods. When using volatile acid catalysts such as hydrogen fluoride, the product is readily separated by distillation. With non-volatile acids such as the sulfonic acids, separation is best accomplished by quenching the reaction mixture in water and filtering off the aqueous solution of catalyst which can be concentrated for reuse. Where a solvent is employed in the reaction zone, it is preferably removed by distillation prior to the aforedescribed quenching.

My invention will now be illustrated by the following examples:

EXAMPLE I

Toluene was amidomethylated with a variety of catalysts by the following procedure:

A measured amount of toluene, generally 80 milliliters, was added to a 200 milliliter flash equipped with a reflux condenser. The catalyst or catalyst and solvent mixture under investigation was added to the toluene and the mixture gently warmed to the desired temperature. N-methylolacetamide was then slowly added to the flask contents over a 10 to 30 minute period in an amount corresponding to a 1:1.3 molal ratio of N-methylolacetamide to toluene. During addition of the N-methylolacetamide the temperature of the reactants gradually increased. After all the N-methylolacetamide had been added the flask was gently warmed to the desired reaction temperature and maintained at this temperature for the desired reaction period; generally 1 to 3 hours. The reaction product was separated, analyzed and the following results obtained:

Table 1

| Catalyst | Temperature, °C. | Reaction Period, Hrs. | Yeild, based on N-methylolacetamide |
|---|---|---|---|
| Methyl sulfonic acid [1] | 107 | 2.0 | 75% |
| Toluene sulfonic acid [2] | 110 | 3.0 | 30 |
| Toluene sulfonic acid [3] | 110 | 2.0 | 34 |
| Trifluoroacetic acid | 100 | 1.0 | 94 |

[1] Diluted with an equal volume of acetic acid solvent.
[2] 10% toluene sulfonic acid in acetic acid.
[3] 10% toluene sulfonic acid in chloroacetic acid.

When the preceding experiment was repeated with the following catalysts, no amidomethylation was observed:

Acetic acid saturated with hydrogen chloride.
Same as above with 6% zinc chloride (trace of a yield).
Concentrated orthophosphoric acid.
Solution of 15% boron trifluoride in acetic acid (5% yield).
Concentrated hydrogen chloride.

The foregoing experiment demonstrates the high degree of activity of the catalysts of my invention contrasted to those suggested by the prior art as addition catalysts for aromatic compounds having electron donating substituents.

EXAMPLE II

A 250 milliliter flask equipped with a reflux condenser, thermowell, stirrer and funnel was placed in a temperature control bath. 50 milliliters of trifluoroacetic acid and 30 milliliters of toluene were added to the flask and thereafter 17.8 grams of N-methylolacetamide were added dropwise to the flask contents over a 45-minute period while the temperature was held at about 30° C. The flask contents were stirred for an hour after the addition of the N-methylolacetamide at 30° C.

The reaction contents were distilled under vacuum to remove the trifluoroacetic acid and excess toluene and the residue was poured into a dilute alkali. The resultant mixture was steam distilled to remove residual traces of toluene, then chilled in an ice bath, filtered and the filtered solid washed and dried. The solid product was obtained at a yield of 26% based on the amount of N-methylolacetamide and comprised 95% of para amidomethylated toluene and 4.3% of ortho amidomethylated toluene.

When the reaction was repeated under varied temperature conditions, the following results were obtained:

| Temperature, °C. | Time, Hours | Yield, Percent | Isomer Distribution, Percent | | |
|---|---|---|---|---|---|
| | | | Para | Ortho | Meta |
| 45 | 1.5 | 32.8 | 91.2 | 8.8 | 0 |
| 56 | 1.5 | 46.3 | 88.2 | 11.8 | 0 |
| 60 | 1.5 | 54.9 | 85.7 | 14.3 | 0 |
| 94 | 1.2 | 78.0 | 75.1 | 24.9 | 0 |

EXAMPLE III 35 milliliters of toluene were added to a 300 milliliter pressure bomb and cooled in an ice bath. 100 milliliters of liquid anhydrous hydrogen fluoride were added and the mixture stirred. To the cooled mixture 17.8 grams of N-methylolacetamide were added over a 10-minute period. The bomb was maintained at 30° C. for 2 hours; then cooled and the hydrogen fluoride removed by evaporation. The residue of the reaction product was then neutralized with aqueous potassium hydroxide and the neutralized product extracted with ethyl ether. The yield of amidomethylated product was 83% which comprised 99.5% ortho(acetamidomethyl) toluene and 0.5% para(acetamidomethyl) toluene.

EXAMPLE IV

Following the procedure of Example III, liquid hydrogen fluoride was used to diamidomethylate para-xylene and naphthalene at 25° C. N-methylolacetamide was employed at a mole-ratio to hydrocarbon reactant of 2:1. At the end of 1 hour reaction period, a 75% yield of a diamidomethylated product was obtained which chiefly comprised 2,5(diacetamidomethyl)1,4(dimethyl) benzene. The yield of diamidomethylated naphthalene was 96% after 1 hour. The reaction was repeated using acetic acid solvent in equal amounts with the liquid hydrogen fluoride catalyst. After 1 hour the yield of the diamidomethylated para-xylene was 87%; of diamidomethylated naphthalene, 80%. Biphenyl was similarly diamidomethylated to obtain a 90% yield after 1 hour at 25° C.

EXAMPLE V

Following the procedure of Example II, trifluoroacetic acid was used to catalyze the diamidomethylation of durene using N-methylolacetamide at a 2:1 mole-ratio to hydrocarbon. At 105° C. and 1 hour the yield of diamidomethylated durene was 90%. The reaction was repeated using N-methylolformamide in lieu of the acetamide derivative at a 2:1 mole-ratio to hydrocarbon. The yield of diamidomethylated durene after 1 hour at 80° C. was 90.3%.

EXAMPLE VI

Following the procedure of Example III, liquid hydrogen fluoride was used to amidomethylate benzene. The yield of N-benzylacetamide obtained was 85% after 2 hours at 30° C. The N-benzylacetamide was again subjected to amidomethylation in liquid hydrogen fluoride for 2 hours at 30° C. and a 56% yield of 1,4(diacetamidomethyl)benzene was obtained.

Following the same procedure, phenylacetic acid and 1-naphthaleneacetic acid were successfully amidomethylated.

The foregoing examples illustrate the ease of the amidomethylation reaction when catalyzed by the catalysts of my invention. High yields of mono- and diamidomethylated aromatics are readily obtained.

The examples are intended solely to illustrate the application of my invention and are not to limit my invention which comprises the steps of obvious equivalents thereof set forth by the following claims.

I claim:

1. A method for the amidomethylation of aromatic hydrocarbons which comprises contacting an aromatic compound containing an active ring hydrogen atom with an N-methylolamide at a reaction temperature between about 0° and about 200° C. in the presence of an acidic condensation catalyst selected from the class consisting of anhydrous hydrogen fluoride, trifluoroacetic acid, and aliphatic and alicyclic sulfonic acids having 1 to 8 carbon atoms, and thereafter recovering a ring-amidomethylated product.

2. A method as defined in claim 1 wherein said aromatic compound is toluene and said N-methylolamide is N-methylolacetamide.

3. The method of claim 1 wherein said N-methylolamide is N-methylolformamide.

4. A method as defined in claim 1 wherein said acidic condensation catalyst is anhydrous hydrogen fluoride.

5. A method as defined in claim 1 wherein said acidic catalyst is trifluoroacetic acid.

6. A method as defined in claim 1 wherein said aliphatic sulfonic acid is methyl sulfonic acid.

7. The preparation of a 4(amidomethyl)toluene which comprises contacting toluene with an N-methylolamide at a temperature between about 10° and about 120° C. and a pressure sufficient to maintain the reactants in liquid phase in the presence of trifluoroacetic acid, and thereafter recovering said 4(amidomethyl)toluene.

8. The method of claim 7 wherein said N-methylolamide is N-methylolacetamide.

9. The method of claim 7 wherein said N-methylolamide is N-methylolformamide.

10. The preparation of a 2(amidomethyl)toluene which comprises contacting toluene with an N-methylolamide at a temperature between about 10° and about 120° C. and a pressure between about 1 and about 20 atmospheres, sufficient to maintain liquid phase conditions in the presence of anhydrous liquid hydrogen fluoride, and thereafter recovering said 2(amidomethyl)toluene.

11. A method for the diamidomethylation of aromatic hydrocarbons which comprises contacting an aromatic compound containing an active ring hydrogen atom with an N-methylolamide; said N-methylolamide being present in an amount at least equal to 2 moles of N-methylolamide per mole of said aromatic; at a reaction temperature between about 0° and about 200° C. in the presence of an acidic condensation catalyst selected from the class consisting of anhydrous hydrogen fluoride, trifluoroacetic acid and aliphatic and alicyclic sulfonic acids having 1 to 8 carbon atoms and recovering a ring-diamidomethylated product.

12. The method of claim 11 wherein said aromatic is benzene.

13. The method of claim 11 wherein said aromatic is naphthalene.

14. The method of claim 11 wherein said aromatic is a xylene.

References Cited in the file of this patent

UNITED STATES PATENTS

| | | |
|---|---|---|
| 2,312,896 | Graenacher et al. | Mar. 2, 1943 |
| 2,969,392 | Schaeffer | Jan. 24, 1961 |
| 3,024,282 | Parris | Mar. 6, 1962 |

OTHER REFERENCES

Houben-Weyl: "Methode der organischen Chemie" (4th ed.), vol. 11, pages 795–97, 800–805 (1957).